INVENTOR
WILLIAM H. PETITT
BY Semmes and Semmes
ATTORNEYS

United States Patent Office 3,449,545
Patented June 10, 1969

3,449,545
METHOD FOR WELDING NODULAR IRON TO STEEL
William H. Petitt, Chattanooga, Tenn., assignor to The Harriman Manufacturing Company, Chattanooga, Tenn., a corporation of Tennessee
Filed Apr. 1, 1964, Ser. No. 356,418
Int. Cl. B23k 9/32, 31/02, 35/24
U.S. Cl. 219—137                    9 Claims The present invention relates to a method for welding materials having different coeficients of thermal expansion and contraction, and in particular to a method for welding modular iron to steel.

Creating a joint or weld between materials having dissimilar characteristics of thermal expansion and contraction is a problem of long standing. It is desirable, of course, to unite the two materials by means of a bond or weld possessing inherent physical strength equal to or greater than that of the materials being welded. However, upon completion of the welding, dissimilar metals contact at different rates thus causing internal stresses resulting in cracking or weakening of the structure.

The present invention concerns a novel method of welding including the insertion of a cushion between the dissimilar materials at their intended point of juncture. The cushion, by virtue of its thermal and physical characteristics of contraction and compressibility, permits the disimilar materials to cool without weakening the joint. That is, the cushion accommodates the differential of contraction of the dissimilar materials. The cushion material may be fibrous, woven or solid as desired. In fact, it may even be made of a material combustile within the working temperature range. Asbestos, however, is the preferred material with which the cushions are made. The shape of the cushion may be corrugated or flat. A similar effect may be achieved with the use of projections from the mating surfaces of one or both of the component parts. In such case, the projections are of sufficient size to perimt their embedding into the other material part upon the contraction of the materials during or after welding. This type of cushion offers resistance of a magnitude equivalent to the product of the area of the projection and the compressive strength of the component part. Stress relieving, when necessary in large welds, should be in the range of 850°–1100° F. When only small welds are required, the upper limit of preheat may be exceeded and the welding accomplished before the temperature drops below the low limit of stress relieving.

The simplicity of the invention herein disclosed is believed to be an important improvement over the patent to Cook (2,790,656) which is concerned with preparing a joint between metals having a great difference in fusion temperatures.

Accordingly, it is an object of the present invention to provide a method for welding materials having different coefficients of thermal expansion and contraction so as to prevent undesirable weakening of the weld or bond upon cooling.

Another object is to provide a method for welding nodular iron to steel with the use of a cushion which accommodates or compensates for the differential of contraction between the nodular iron and steel.

Yet, additional objects of invention will become apparent from the ensuing specification an attached drawings wherein.

Figure 1:
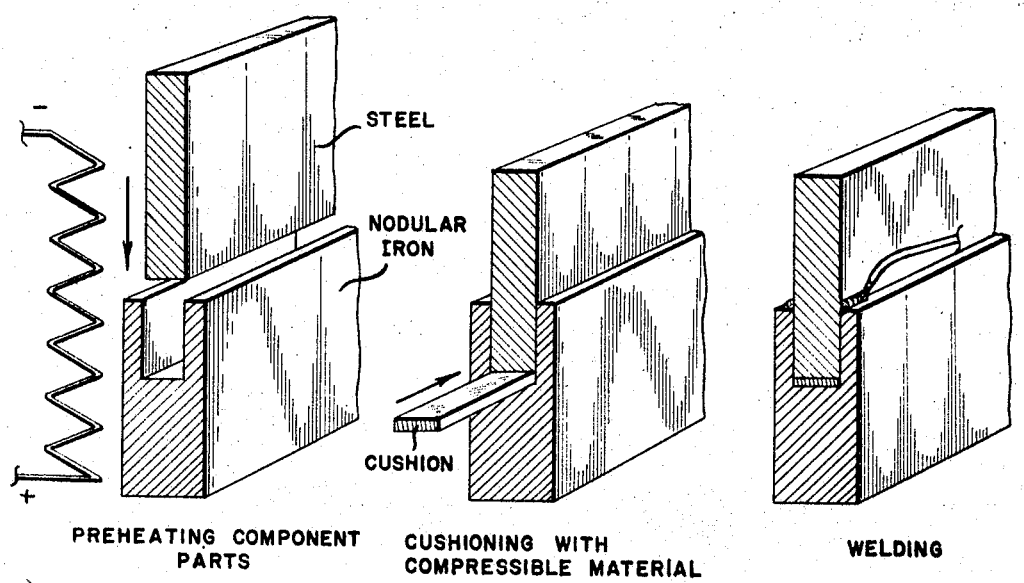
FIGURE 1 is a prespective view showing schematically the method steps of preheating, inserting the cushion, and welding.
Figure 2:
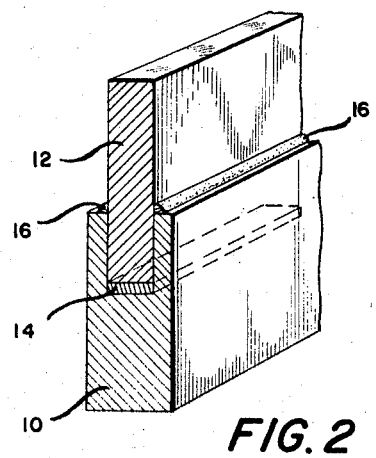
FIGURE 2 is a perspective view of a section of nodular iron welded to steel showing the preferred embodiment of he cushion inserted in place.

As seen in FIGURES 1 and 2, the noval method of welding, and in particular the prefered shape of cushion employed in said method consists of a flat piece of asbestos inserted between a section of nodular iron 10 and a section of steel 12. As illustrated schematically in FIGURE 1, the section of noduar iron 10 and/or the section of steel 12 are preheated by any conventional means such as electrical resistance as schematicaly shown, the flat asbestos cushion 14 inserted between the section of nodular iron 10 and that portion of steel member 12 lying adjacent thereto. Then, the nodular iron 10 and steel 12 are welded at joints or bonds 16 by means of a low hydrogen welding rod or other selected rod compatible with the analysis of the iron and steel components. The welder polarity can be normal or reversed in the method disclosed herein.

Figure 3:
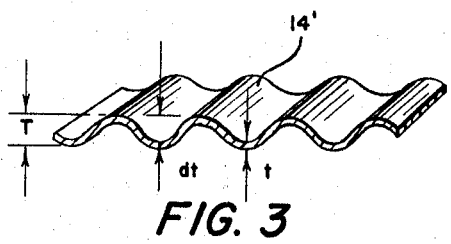
FIGURE 3 is a perspective view of a modified embodiment of the cushion.

In the second embodiment of the novel cushion as illustrated by FIGURE 3, the flat asbestos cushion 14 is replaced with corrugated cushion 14' which may, for convenience, be made from any suitable metal. With reference to the corrugated cushion, T designates the cushion thickness before use, $t$ indicates the cushion thickness after use and $dt$ the difference of the coefficients of expansion and constraction and/or the normal shrinkage due to welding.

Figure 4:
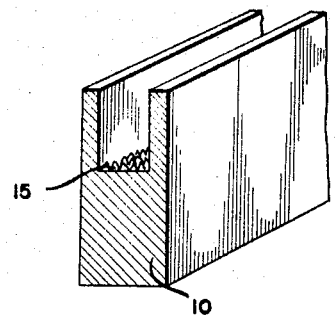
FIGURE 4 is another modification of the cushion showing a series of projections on the mating surface of one of the component parts to be welded.

In a third embodiment of the novel cushion as illustrated in FIGURE 4, numerous projections 15 of one or more of the component parts 10 provide the desirable cushioning effect. The cushion 15 offers resistance of a magnitude equivalent to the product of the area of the projection and the compression strength of the component parts.

Figure 7:
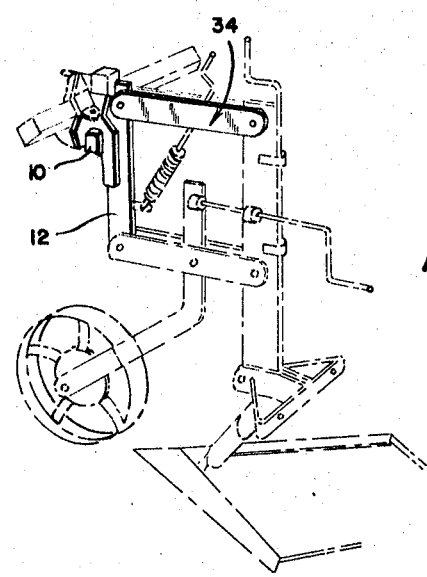
FIGURE 7 is a prespective view showing an agricultural cultivator having two sections of a hitch frame welded together by applicant's inventive method.

The preferred shape of cushion 14 as seen in FIGURE 2 is designed primarily for insertion between two sections of a hitch frame used in conjunction with an agricultural cultivator. As clearly seen in FIGURE 7, the joint between nodular iron section 10 and steel section 12 of hitch frame 34 is subjected to great stress thus necessitating a weld of strength equal to or in excess of that of the hitch frame sections 10 and 12 such as is possible with the use of applicant's novel method of welding.

Figure 5:
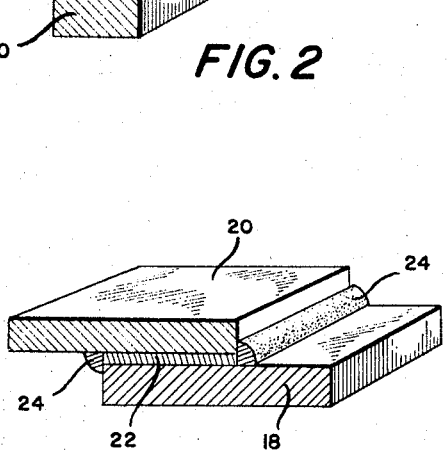
FIGURE 5 is a perspective view showing the location of the preferred embodiment of the cushion where overlap welding is employed.
Figure 6:
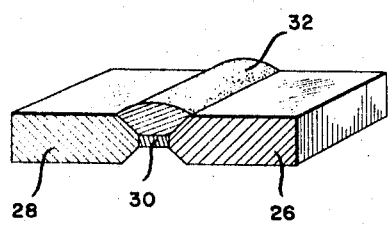
FIGURE 6 is a perspective view showing the location of the preferred embodiment of the cushion where butt welding is employed.

As seen in FIGURES 5 and 6, applicant's novel method of welding including the insertion of an asbestos cushion may also be employed with conventional methods of "overlap" and "butt" welding.

In FIGURE 5, the nodular iron 18 is "overlapped" by steel 20 with cushion 22 inserted between the points of overlapping. Then, the corners 24 are welded. In butt welding as shown in FIGURE 6, the nodular iron 26 is separated from the steel 28 by cushion 30. Then, the joints 32 are welded.

Manifestly, reconfiguration of the cushions and application to different forms of welding may be employed without departing from the scope of invention, as defined in the subjoined claims.

I claim:
1. Method for welding nodular iron to steel comprising:
   (A) pre-heating the nodular iron and steel;

(B) cushioning with a compressible material capable of accommodating the differential of contraction between said nodular iron and steel in the area of contact between said nodular iron and said steel; and (C) welding said nodular iron to said steel.

2. Method as in claim 1, wherein said pre-heating is within a temperature range of 625° F. to 800° F.

3. Method as in claim 2, wherein said welding is accomplished with the use of a low hydrogen arc welding rod.

4. Method as in claim 1, wherein said cushioning is by means of an asbestos strip.

5. Method as in claim 4, wherein said asbestos strip is uniform in thickness.

6. Method as in claim 4, wherein said cushion is made from corrugated metal.

7. Method of welding nodular iron to steel comprising:
(A) pre-heating the nodular iron to a temperature within the range of 625° F. to 800° F.;
(B) inserting an asbestos cushion between said nodular iron and steel so as to absorb the differential contractive cooling effects of said nodular iron and said steel; and
(C) welding said nodular iron and said steel at pre-selected points.

8. Method for welding a first and second materials having different coefficients of thermal contraction comprising:
(A) preheating said first material within a pre-selected temperature range;
(B) cushioning with a compressible asbestos material capable of accommodating the differential of contraction between said first and second materials in the area of contact between said first and second materials; and
(C) welding said first and second materials at pre-selected points.

9. Method as in claim 2, wherein said welding is accomplished with the use of a welding rod compatible with said iron and steel.

References Cited

UNITED STATES PATENTS

| | | | |
|---|---|---|---|
| 2,015,340 | 9/1935 | Fischer | 94—18 |
| 2,038,439 | 4/1936 | Moss | 29—470 X |
| 2,068,533 | 1/1937 | Coffman | 161—94 X |
| 2,362,505 | 11/1944 | Smith | 29—491 X |
| 2,790,656 | 4/1957 | Cook | 287—20.2 |
| 2,792,626 | 5/1957 | Chyle | 29—491 |
| 3,114,612 | 12/1963 | Friedrich | 29—195 |
| 3,137,937 | 6/1964 | Cowan et al. | 29—495.5 |

OTHER REFERENCES

Metals Handbook, vol. 1, December 1961, American Society For Metals, p. 388, Welding and Brazing.

RICHARD M. WOOD, *Primary Examiner.*

J. G. SMITH, *Assistant Examiner.*

U.S. Cl. X.R.

29—470, 498; 219—118